Aug. 5, 1924.
J. STRAUSS
AUTOMOBILE
Original Filed March 3, 1920    4 Sheets-Sheet 1
1,503,721
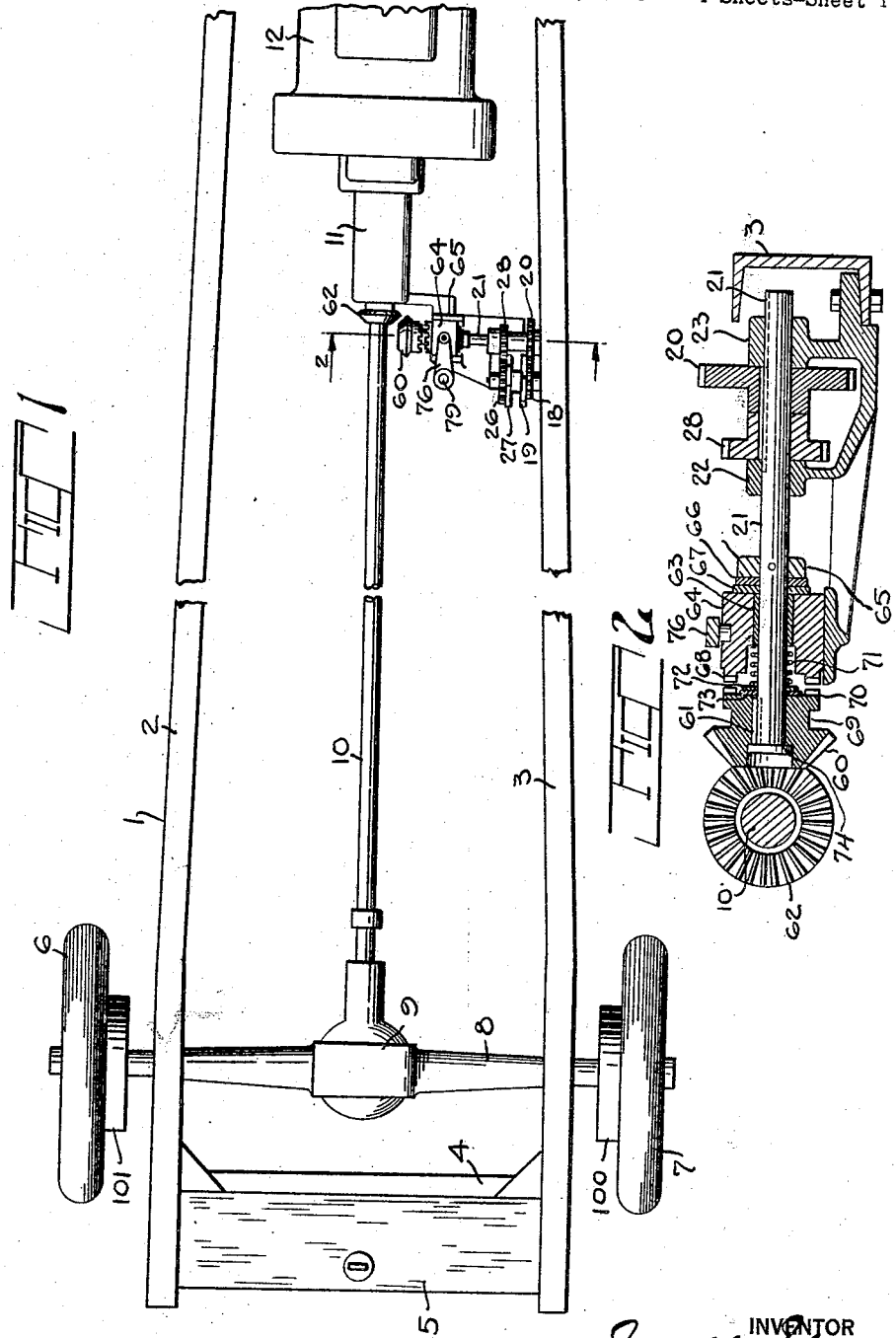
INVENTOR
Joseph Strauss
BY
John D. Morgan
ATTORNEY Aug. 5, 1924.
J. STRAUSS
AUTOMOBILE
Original Filed March 3, 1920   4 Sheets-Sheet 2
1,503,721
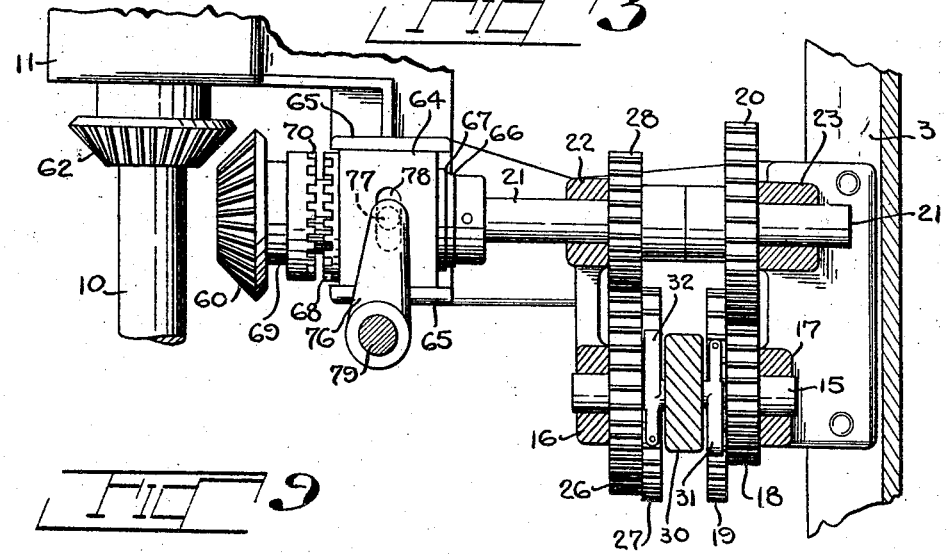
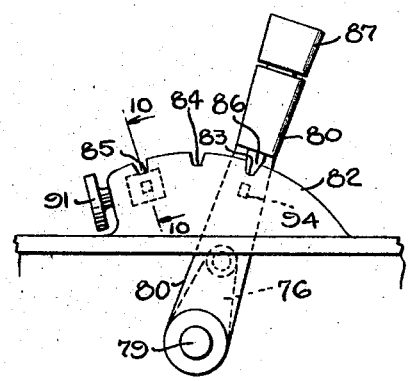
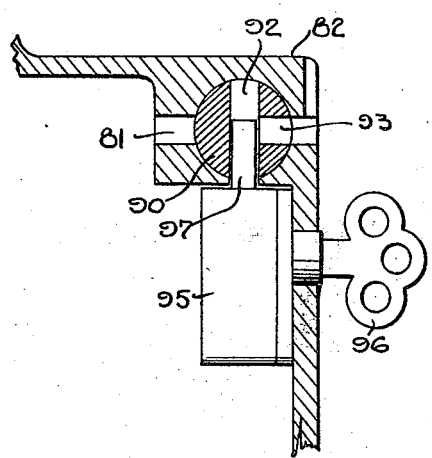
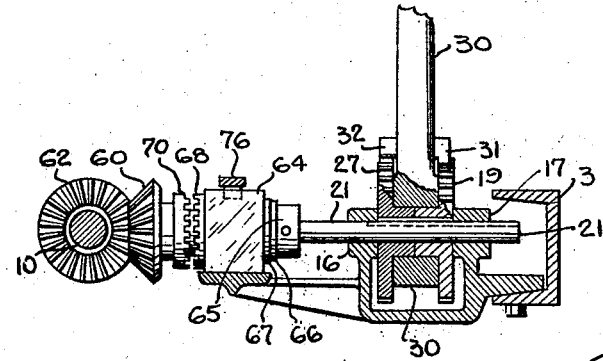
INVENTOR
J. Strauss
BY
John D. Morgan
ATTORNEY Aug. 5, 1924.
J. STRAUSS
1,503,721
AUTOMOBILE
Original Filed March 3, 1920   4 Sheets-Sheet 3
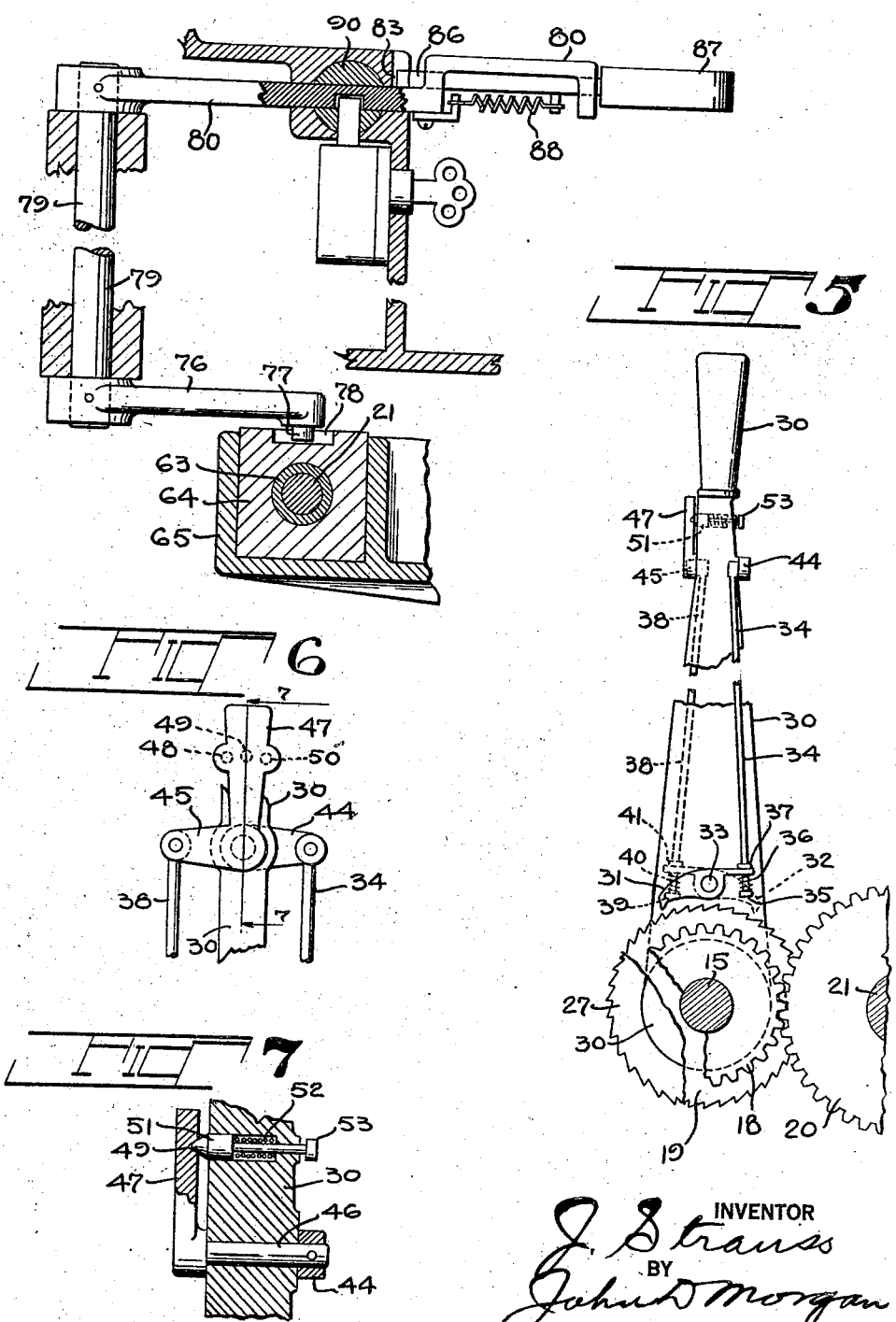

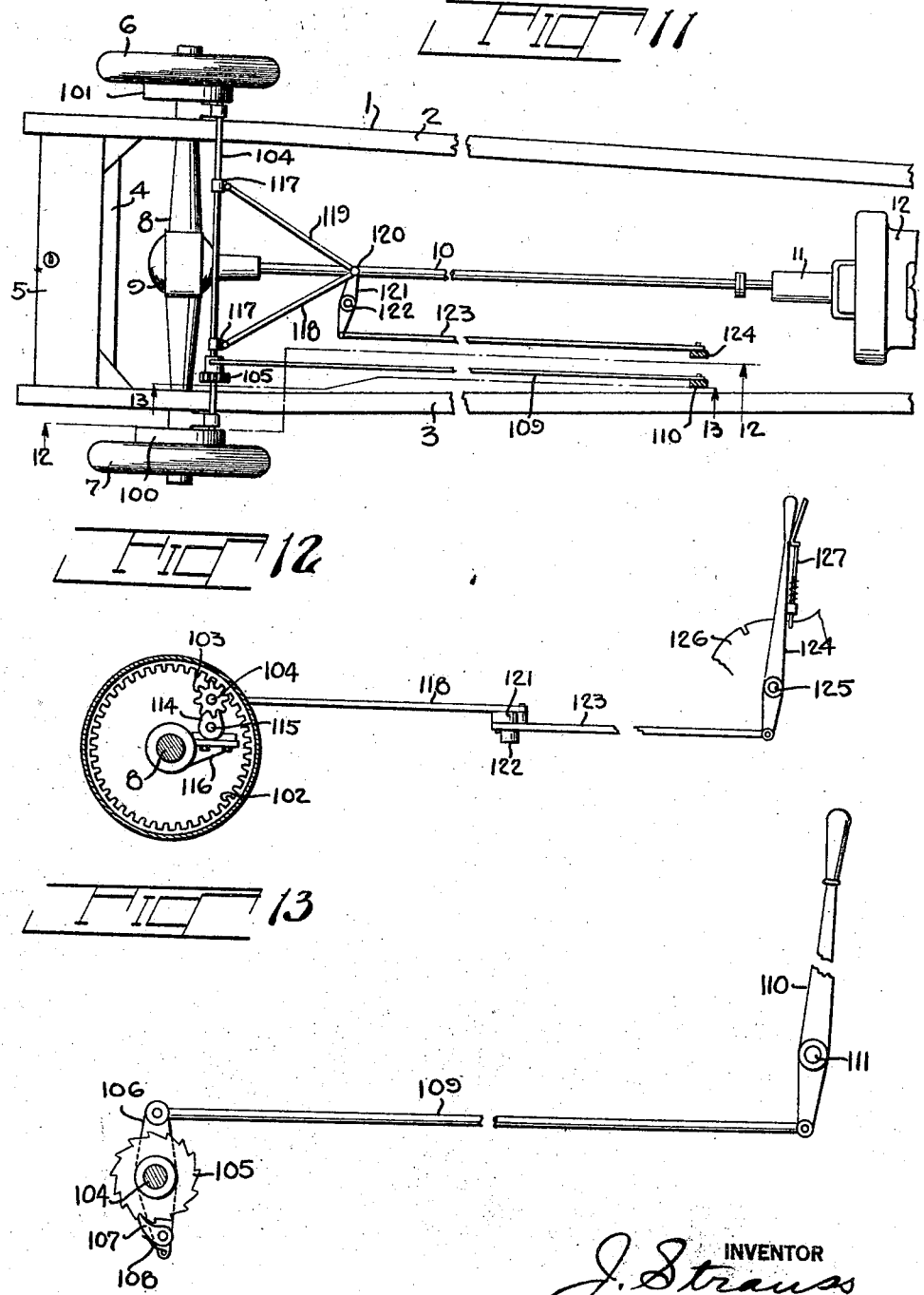

Patented Aug. 5, 1924.

1,503,721

UNITED STATES PATENT OFFICE.

JOSEPH STRAUSS, OF NEW YORK, N. Y., ASSIGNOR TO ABRAHAM KAPLAN, OF NEW YORK, N. Y.

AUTOMOBILE.

Application filed March 3, 1920, Serial No. 362,984. Renewed January 16, 1924.

*To all whom it may concern:*

Be it known that I, JOSEPH STRAUSS, a citizen of the United States, residing in New York, in the county and State of New York, have invented certain new and useful Improvements in Automobiles, of which the following is a specification.

The invention relates to automobiles, to emergency auxiliary driving means therefor, and more particularly to manually operated emergency auxiliary driving means therefor.

Objects and advantages of the invention will be set forth in part hereinafter and in part will be obvious herefrom, or may be learned by practice with the invention; the same being realized and attained through the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description serve to explain the principles of the invention.

Of the drawings:—

Fig. 1 is a top plan of a motor car chassis embodying the invention;

Fig. 2 is a fragmentary, detail vertical section, on an enlarged scale, taken on line 2—2 of Fig. 1;

Fig. 3 is a fragmentary, detail top plan, with parts in section, on a further enlarged scale, of the mechanism shown in Fig. 2, and in the lower left hand part of Fig. 1;

Fig. 4 is a fragmentary detail elevation, corresponding to Fig. 2, but showing the manual drive directly on the clutch shaft, and showing parts in section;

Fig. 5 is a fragmentary detail elevation of the manually operated actuating means for the emergency auxiliary driving mechanism;

Fig. 6 is a fragmentary detail of the upper part of the lever shown in Fig. 5, but with the handle broken away;

Fig. 7 is an enlarged fragmentary, sectional detail taken on line 7—7 of Fig. 6;

Fig. 8 is an enlarged fragmentary detail, on an enlarged scale, of the clutching and locking mechanism;

Fig. 9 is a detail elevation, somewhat reduced in size, looking at Fig. 8 from the upper side thereof;

Fig. 10 is an enlarged, sectional detail, taken on line 10—10 of Fig. 9;

Fig. 11 is a fragmentary plan of a chassis showing a different form of mechanism from Fig. 1;

Fig. 12 is a partial elevation and partial section taken on line 12—12 of Fig. 11; and Fig. 13 is a partial elevation and partial section taken on line 13—13 of Fig. 11.

The present invention has in view providing manually operable auxiliary emergency car driving means whereby a relatively light or small size motor car may be propelled by the driver sitting within the car, when the usual motive power of the car has failed or broken down from any cause, to a garage or repair shop. Said means are provided of simple and compact form, adapted to be operated by hand from the driver's seat, although a foot lever or drive could be used if desired, so far as concerns the general features of the invention. In connection with the foregoing, means are provided for securely locking the car including the entire motive mechanism thereof.

As embodied, the present invention comprises a power applying lever or the like, operating by a pawl and ratchet upon a gearing mechanism, which gearing mechanism is connectable to the driving mechanism of the car, preferably between the transmission or gear changing mechanism and the differential mechanism, although it will be understood that variations may be made from the preferred embodiment as described. The locking means comprises mechanism which positively locks the power shaft, the differential mechanism, and the rear or driving wheels of the car.

Referring now in detail to the embodiment of the invention illustrated by way of example in the accompanying drawings, the chassis 1 of a motor car is shown, having side frames 2 and 3 and an end or cross frame piece 4. A gas tank 5 is shown at the rear. The rear or driving wheels 6 and 7 are mounted on an axle 8, having a differential mechanism, inclosed in a casing 9. Connecting from the differential mechanism is the power shaft 10, extending to the transmission or gear shifting mechanism inclosed in a casing 11. The engine is usually of the internal combustion type and is indicated by 12.

The auxiliary emergency driving mechanism is preferably connected to the power shaft 10 between the transmission mechanism and the differential mechanism. In the present embodiment, the power is manually applied by means of a pivoted hand lever operating a pawl and ratchet mechanism.

As embodied (Figs. 1, 2 and 3) a shaft 15 is journaled in bearings 16 and 17 on the machine frame. Mounted loosely on shaft 15 is a gear wheel 18, to which is fixed a ratchet wheel 19, which is also loose on shaft 15. Meshing with gear wheel 18 is a gear wheel 20 which is splined on a shaft 21, which shaft is journaled in bearings 22 and 23 on the machine frame.

Also loosely mounted on shaft 15 is a gear wheel 26, to which wheel is fixed a ratchet wheel 27. Gear wheel 26 meshes with a gear wheel 28, which is splined on shaft 21. It will be understood that the gear drive may be optionally single or double, as described, and that the double drive may be used for different gear ratios to be employed selectively or alternatively forward, or it may be used for a forward and backward drive, if desired.

As embodied, a power applying lever 30 is pivotally and loosely mounted on shaft 15, and pivotally mounted on lever 30, are two pawls 31 and 32, pawl 31 cooperating with ratchet wheel 19, and pawl 32 cooperating with ratchet wheel 27. As embodied, the pawls are oppositely arranged or positioned, in which arrangement the pawls are employed selectively or alternatively for either a forward or backward drive. When the ratchet wheels and pawls are arranged in the same direction, they can be employed alternatively or selectively to provide different gear ratios in the drive.

In the embodied means for alternatively throwing in and out the pawls 31 and 32, or for throwing out both simultaneously (Fig. 5), pawl 31 is pivotally mounted at 33 on lever 30, and a rod 34 passes loosely through an aperture in the tail of the pawl 31. Rod 34 has a collar 35 at its bottom end and a spring 36 is coiled about the rod, in compression between the collar and the pawl. A collar 37 is fixed to rod 34 just above pawl 31. Similarly a rod 38 passes loosely through the tail of pawl 32 and has a collar 39 on the bottom thereof, and a spring 40 is coiled about the rod, in compression between the collar 39 and the pawl 32. A collar 41 is fixed to rod 38 above pawl 32.

Rod 34 at its upper end (Figs. 5, 6 and 7) is pivoted to a lever arm 44, and rod 38 at its upper end is pivoted to a lever arm 45, which arms are both fixed to a shaft 46, journaled in and passing through lever 30. Fixed also to shaft 46 is an arm 47.

A detent mechanism is provided for holding either pawl alternatively or selectively in operative position with respect to its ratchet wheel, or for holding both pawls simultaneously in inoperative position. As embodied arm 47 has three depressions 48, 49 and 50 therein. Mounted in lever 30 is a bevel pointed detent pin 51, which pin is impelled outwardly by a coil spring 52, and has a limiting or stop head 53. Pin 51 will hold lever arm 47 in either of three positions by engagement, respectively, with the detent holes 48, 49 and 50. Thus by moving arm 47, either pawl 31 or 32 may be thrown in while the other is held out, or both pawls can be held in inoperative position when arm 47 is in central position. When either arm 44 or 45 is rocked upwardly, by means of arm 47, the corresponding spring 36 or 40 is compressed and thereby spring presses its pawl into engagement with its ratchet wheel to effect the driving of the mechanism.

Referring now to the clutching mechanism proper, and to the driving connections between the mechanism just described and the power shaft, shaft 21 (which is rotated from hand lever 30, through pinions or gears 20 or 28) has mounted on the outer end thereof (Figs. 1, 2 and 3) a bevel gear wheel 60. Gear 60 is connected to shaft 21 by a spline 61 to rotate therewith, the shaft and gear being relatively longitudinally movable. A bevel gear wheel 62 is fixed on power shaft 10 and bevel gear 60 is adapted to pass into and out of mesh therewith.

Mounted loosely on shaft 21 is a sleeve 63, which sleeve is loosely mounted in a longitudinally slidable, non-rotatable block 64, which is preferably of angular exterior conformation, and is slidably mounted in a bearing 65 on the machine frame. Fixed on shaft 21 is a collar 59, and washers 66 and 67 may be employed between it and block 64.

Block 64 is provided on its outer end with a series of crown or peripheral teeth 68, and the hub 69 of bevel gear wheel 60 has a cooperating series of crown or peripheral teeth 70. Block 64 is internally cylindrically hollowed and nested in said hollow is a spring 71, which is coiled about shaft 21 and is in compression between block 64 and bevel gear 60. Washers 72 and 73 may be employed as a bearing between the spring and the hub of bevel gear 60. Shaft 21 has a head 74 which holds bevel gear 60 on the shaft.

The parts are positioned and controlled through sliding block 64 in its bearing. When block 64 is moved to the extreme right in Fig. 2, it acts against collar 65 and throws gears 60 and 62 out of mesh. When block 64 is moved backwardly to intermediate position, gear 60 meshes with gear 62 and shaft 10 is driven from shaft 21. In this intermediate or driving position, spring 71 keeps teeth 68 and 70 out of engagement with each other. When, however, block 64 is moved to the extreme left hand position in Figs. 2 and 3, gear 60 being already in mesh with gear 62, spring 71 is compressed, and teeth 68 mesh with teeth 70. As block 64 is non-rotatable, the entire mechanism including shaft 10 and the rear driving wheels 6 and 7 is locked.

The means for imparting to block 64 the movements described, and for locking the parts in their locking position, as embodied, comprise an arm 76, having in its free end a pin 77, which pin projects into a recess 78 in the side of block 64. Arm 76 is fixed on a shaft 79, which shaft is journaled in the machine frame. Fixed to shaft 79 is an actuating and locking lever 80.

Lever 80 works in a slot 81 formed in the machine frame, and cooperates with a notched sector 82, having notches 83, 84 and 85. A latch 86 cooperates with the notches and is mounted on a hand piece 87, which is mounted in lever 80, and a spring 88 impels the latch 86 into the notches. It will be clear that as lever 80 is swung or moved from one to another of notches 83, 84 and 85, block 64 will be moved, and the cooperating and connected mechanism will be operated and controlled as already described.

Means are provided for both preventing and permitting lever 80 being moved into the machine locking position, and also for locking lever 80 in that position, and thereby locking the machine. As embodied, in the frame and in alinement with slot 81, a cylinder 90 is rotatably mounted, and is provided with a knob 91, whereby it may be rotated by hand. Cylinder 90 is provided with a slot 92, which alines with slot 81 in one position of the rotatable cylinder 90. Cylinder 90 has also a slot 93 disposed at right angles to slot 92. A recess 94 is formed in lever 80.

Inclosed within the machine casing is a lock 95, having a key 96. The bolt 97 of the lock is adapted to project into slot 92 when the parts are in the position of Fig. 10, and thus will prevent rotation of cylinder 90 by means of knob 91. This will prevent lever 80 from being moved into notch 85, that is, it will prevent block 64 being moved into the machine locking position. It leaves lever 80 free to be moved from notch 84 to 83 and back, and thus will permit gears 60 and 62 being thrown into and out of mesh.

If lock 95 be unlocked, bolt 97 being thereby withdrawn, and cylinder 90 is then given a quarter turn by means of knob 91, slot 92 will be brought into alinement with slot 81, and lever 80 may be moved into notch 85. This brings teeth 68 and 70 into engagement and locks shaft 10 and wheels 6 and 7, as already described. Recess 94 is now in alinement with slot 93, and by turning key 96, bolt 97 passes through slot 93 and enters recess 94 in lever 80, and the mechanism is locked in locked position.

In Fig. 4 the ratchet wheels 19 and 27, or the corresponding wheels, are splined directly on shaft 21, making a direct drive or power application from hand lever 30 without a gear reduction such as is provided in the mechanism already described. The lever 30 may be either a hand or foot lever as desired. The remaining mechanism may be as already described and such description need not be repeated at this point.

In Figs. 11, 12 and 13 are shown a somewhat different form of mechanism, although it will be understood that all the illustrated forms are explanatory and not restrictive of the invention. In said figures, the manually operated drive is applied directly to the rear wheels 6 and 7.

As here embodied, within the brake drums or equivalent structures 100 and 101 are formed internal gears 102, and within said gears and meshing therewith are pinions 103. Pinions 103 are fixed on a shaft 104, and fixed on said shaft is a ratchet wheel 105. Pivoted on shaft 104 is a lever 106, and a pawl 107, pressed by a spring 108, is carried on lever 106 and cooperates with ratchet wheel 105. Pivoted to lever 106 is a rod 109, which at its other end is pivoted to a hand lever 110, which lever is pivoted at 111 on the machine frame. As lever 110 is rocked, ratchet wheel 105 and shaft 104 and pinion 103 are rotated, and through gear 102, wheels 6 and 7 are rotated to propel the car.

Means are provided for throwing in and out pinions 103 from engagement with internal gears 102, as they will be in mesh only when the hand power is being used for propulsion. Such means, as embodied, comprise a pair of arms 114 at opposite sides of the car, in which arms shaft 104 is journaled. Arms 114 are pivotally mounted at 115 on brackets 116, which brackets are supported on the machine frame, and may be mounted if desired concentrically with the axle 8.

Loosely mounted on shaft 104 are two sleeves 117, relatively widely separated along the shaft. Pivotally connected to sleeves 117 are rods 118 and 119, respectively, and at their other ends 120, rods 118 and 119 are pivotally connected to a lever 121. Lever 121 is pivotally supported at 122, and at its opposite end, it is pivotally connected to a rod 123. Rod 123 is pivotally connected to a lever 124, which lever is pivotally supported at 125. Lever 124 cooperates with a notched plate 126 by means of a spring latch 127. By rocking lever 124, pinions 103 may be thrown into or out of mesh with the corresponding internal gear ring 102.

The invention in its broader aspects is not limited to the specific mechanism shown and described but departures may be made therefrom within the scope of the accompanying claims without departing from the principles of the invention and without sacrificing its chief advantages.

What I claim is:—

1. An automobile including in combination an engine, a transmission mechanism, a power shaft, a differential mechanism, the rear axle and wheels, and an emergency auxiliary driving mechanism comprising a man-operated power applying lever and gearing between said lever and the power shaft.

2. An automobile including in combination an engine, a transmission mechanism, a power shaft, a differential mechanism, the rear axle and wheels, and an emergency auxiliary driving mechanism comprising a man-operated power applying lever, gearing driven thereby, and a gear wheel on the power shaft.

3. An automobile including in combination an engine, a transmission mechanism, a power shaft, a differential mechanism, the rear axle and wheels, and an emergency auxiliary driving mechanism comprising a man-operated power applying lever, gearing driven thereby, a gear wheel on the power shaft, and means for connecting and disconnecting said gearing.

4. An automobile including in combination an engine, a transmission mechanism, a power shaft, a differential mechanism, the rear axle and wheels, and an emergency auxiliary driving mechanism comprising a man-operated power applying lever, gearing between said lever and the power shaft, and means for locking said auxiliary emergency driving mechanism to lock the rear wheels.

5. An automobile including in combination an engine, a transmission mechanism, a power shaft, a differential mechanism, the rear axle and wheels, and an emergency auxiliary driving mechanism comprising a power applying lever, gearing driven thereby, a gear wheel on the power shaft, and means for locking said auxiliary emergency driving mechanism to lock the rear wheels.

6. An automobile including in combination an engine, a transmission mechanism, a power shaft, a differential mechanism, the rear axle and wheels, an emergency auxiliary driving mechanism comprising a power applying lever, gearing driven thereby, a gear wheel on the power shaft, means for connecting and disconnecting said gearing, and means for locking said auxiliary emergency driving mechanism when in said connected position to lock the rear wheels.

7. An automobile including in combination an engine, a transmission mechanism, a power shaft, a differential mechanism, the rear axle and wheels, and an emergency auxiliary driving mechanism comprising a power applying lever, a pawl and ratchet wheel operated by said lever, and gearing between said lever and the power shaft.

8. An automobile including in combination an engine, a transmission mechanism, a power shaft, a differential mechanism, the rear axle and wheels, and an emergency auxiliary driving mechanism comprising a power applying lever, a plurality of pawls and cooperating ratchet wheels, means for selectively operating same, and gearing between said lever and the power shaft.

9. An automobile including in combination means for driving the car comprising the rear axle and wheels, and an auxiliary emergency driving mechanism comprising a man-operated power applying reciprocable lever and means for transmitting power therefrom to the rear wheels including connectable and disconnectable gearing.

10. An automobile including in combination means for driving the car comprising the rear axle and wheels, and an auxiliary emergency driving mechanism comprising a man-operated power applying lever and means for transmitting power therefrom to the rear wheels including connectable and disconnectable gearing and a manually operable gear shift therefor.

11. An automobile including in combination means for driving the car comprising the rear axle and wheels, and an auxiliary emergency driving mechanism comprising a power applying lever and means for transmitting power therefrom to the rear wheels including connectable and disconnectable gearing and means for locking the auxiliary emergency driving mechanism when the gearing is connected to lock the rear wheels.

12. An automobile including in combination means for driving the car comprising the rear axle and wheels, and an auxiliary emergency driving mechanism comprising a power applying lever and means for transmitting power therefrom to the rear wheels including connectable and disconnectable gearing, means for connecting and disconnecting the gearing, and means for locking the auxiliary emergency driving mechanism when the gearing is connected to lock the rear wheels.

13. An automobile including in combination means for driving the car comprising the rear axle and wheels, and an auxiliary emergency driving mechanism comprising a power applying lever and means for transmitting power therefrom to the rear wheels including a pawl mounted on the lever, a ratchet wheel and connectable and disconnectable gearing.

14. An automobile including in combination means for driving the car comprising the rear axle and wheels, and an auxiliary emergency driving mechanism comprising a power applying lever and means for transmitting power therefrom to the rear wheels including a pawl and ratchet wheel and connectable and disconnectable gearing and means for locking the auxiliary emergency driving mechanism when the gearing is connected to lock the rear wheels.

15. An automobile including in combination means for driving the car comprising the rear axle and wheels, and an auxiliary emergency driving mechanism comprising a power applying lever and means for transmitting power therefrom to the rear wheels including a plurality of selectively operated pawls and cooperating ratchet wheels for changing the speed ratio and connectable and disconnectable gearing.

16. An automobile including in combination means for driving the car comprising the rear axle and wheels, and an auxiliary emergency driving mechanism comprising a power applying lever and means for transmitting power therefrom to the rear wheels including a plurality of selectively operated pawls and cooperating ratchet wheels for changing the speed ratio and connectable and disconnectable gearing between said pawl and ratchet wheels and the rear axle, and means for connecting and disconnecting the gearing.

17. An automobile including in combination means for driving the car comprising the rear axle and wheels, and an auxiliary emergency driving mechanism comprising a power applying lever and means for transmitting power therefrom to the rear wheels including a plurality of selectively operated pawls and cooperating ratchet wheels and connectable and disconnectable gearing and means on the power applying lever for selecting a desired pawl and ratchet wheel.

18. An automobile including in combination means for driving the car comprising a rear axle and wheels, and an auxiliary emergency driving mechanism comprising a power applying lever and means for transmitting power therefrom to the rear wheels including a pawl and ratchet wheel and connectable and disconnectable gearing located between the pawl and ratchet wheel and the rear axle.

19. An automobile including in combination an engine, a transmission mechanism, the rear axle and wheels, and a power shaft between the transmission and rear axle, and a man-power emergency drive connectable to and disconnectable from the power shaft to the rear of the transmission.

20. An automobile including in combination power and driving means for driving the car, an axle and wheels, an auxiliary man-operated emergency power mechanism connectable to and disconnectable from said driving means, and including devices for driving the car forwardly or backwardly.

21. An automobile including in combination power means for driving the car, an axle and wheels, an auxiliary man-operated emergency power mechanism connectable to and disconnectable from said driving means, and including devices alternatively selectable for driving the car forwardly or backwardly.

In testimony whereof, I have signed my name to this specification.

JOSEPH STRAUSS.